(12) United States Patent
Jeong et al.

(10) Patent No.: US 11,652,231 B2
(45) Date of Patent: May 16, 2023

(54) SECONDARY BATTERY CELL SUPPLY APPARATUS FOR PROCESS OF FOLDING SECONDARY BATTERY CELL

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 335 days.

(21) Appl. No.: 16/928,570

(22) Filed: Jul. 14, 2020

(65) Prior Publication Data
US 2021/0280892 A1 Sep. 9, 2021

(30) Foreign Application Priority Data

Mar. 4, 2020 (KR) .................. 10-2020-0027428

(51) Int. Cl.
| | |
|---|---|
| *B65H 5/14* | (2006.01) |
| *H01M 10/04* | (2006.01) |
| *H01M 50/116* | (2021.01) |
| *B25J 15/06* | (2006.01) |

(Continued)

(52) U.S. Cl.
CPC .......... *H01M 10/0404* (2013.01); *B65H 5/14* (2013.01); *H01M 50/116* (2021.01); *B25J 15/0052* (2013.01); *B25J 15/0616* (2013.01); *B65H 5/222* (2013.01);
(Continued)

(58) Field of Classification Search
CPC .......... B65H 5/085; B65H 5/14; B65H 5/222; B65H 29/241; B65H 2301/4472; B65H 2555/30; B65H 2555/10; B65H 2301/447; B65H 2301/4471; B25J 9/0084; B25J 15/0616; B25J 15/0052
See application file for complete search history.

(56) References Cited

U.S. PATENT DOCUMENTS

| | | | | |
|---|---|---|---|---|
| 3,802,699 | A | * | 4/1974 | Wiig ...................... B65H 29/62 271/197 |
| 2006/0017298 | A1 | * | 1/2006 | Osten ................... B25J 15/0616 294/65 |

(Continued)

FOREIGN PATENT DOCUMENTS

KR     10-2016-0049709 A     5/2016

*Primary Examiner* — Scott W Dodds
(74) *Attorney, Agent, or Firm* — Harness, Dickey & Pierce, P.L.C.

(57) ABSTRACT

There is provided a secondary battery cell supply apparatus for a process of folding a secondary battery cell, including: a first device configured to grip a secondary battery cell for a cell folding process received in a tray and raise the secondary battery cell for a cell folding process vertically upward; a second device configured to grip the secondary battery cell for a cell folding process gripped by the first device and transfer the secondary battery cell for a cell folding process in a transverse direction when the first device releases the secondary battery cell for a cell folding process; and a third device configured to grip the secondary battery cell for a cell folding process gripped by the second device, rotate the secondary battery cell for a cell folding process, and move the secondary battery cell for a cell folding process upward and downward.

3 Claims, 7 Drawing Sheets

(51) Int. Cl.
*B65H 5/22* (2006.01)
*B25J 15/00* (2006.01)

(52) U.S. Cl.
CPC .............. *B65H 2301/4471* (2013.01); *B65H 2301/4472* (2013.01); *B65H 2555/10* (2013.01); *B65H 2555/30* (2013.01)

(56) References Cited

U.S. PATENT DOCUMENTS

| | | | |
|---|---|---|---|
| 2010/0228388 A1* | 9/2010 | Ago | B65G 59/045 414/752.1 |
| 2012/0204517 A1* | 8/2012 | Stollery | B65G 43/10 53/531 |

* cited by examiner

SECONDARY BATTERY CELL SUPPLY APPARATUS FOR PROCESS OF FOLDING SECONDARY BATTERY CELL

CROSS-REFERENCE TO RELATED APPLICATIONS

This application claims the priority of Korean Patent Application No. 10-2020-0027428 filed on Mar. 4, 2020, in the Korean Intellectual Property Office, the disclosure of which is incorporated herein by reference.

FIELD

The present disclosure relates to a secondary battery cell supply apparatus for a process of folding a secondary battery cell, and more particularly, to a secondary battery cell supply apparatus for a process of folding a secondary battery cell, the secondary battery cell supply apparatus being configured to transfer a secondary battery cell to a cell folding process and capable of reducing the tact time and of being easy to maintain.

BACKGROUND

This section provides background information related to the present disclosure which is not necessarily prior art.

Recently, secondary batteries have been used in a wider field of application and the use of the secondary battery rapidly increases. Among the secondary batteries, a pouch-type secondary battery is structured by putting a separator, positive and negative electrode plates, and an electrolyte into a pouch and sealing the circumference of the pouch.

Due to the structural properties of the secondary battery, the pouch needs to be sealed to prevent electrodes and substances in the pouch from being exposed to the outside.

A sealed portion itself, which is sealed and protrudes laterally, is likely to be damaged.

Therefore, the sealed portion of the pouch-type secondary battery cell is subjected to a process of folding a secondary battery cell that folds the sealed portion inward and then bonds the sealed portion.

In general, a secondary battery cell folding process is performed by being supplied with the secondary battery cell which is made by putting the separator, the positive and negative electrode plates, and the electrolyte into the pouch and sealing the pouch, and supplied in a state in which the secondary battery cell is received in a particular receiving means.

In this case, there is a need for a secondary battery cell supply apparatus capable of transferring a secondary battery cell, which is received in a receiving means and used for a cell folding process, to the cell folding process within a short period of time.

DOCUMENT OF RELATED ART

Patent Document

1. Korean Patent Application Laid-Open No. 10-2016-0049709

SUMMARY

An object of the present disclosure is to provide a secondary battery cell supply apparatus for a cell folding process, the secondary battery cell supply apparatus being capable of reducing the tact time required for an operating process of moving a secondary battery cell, which is to be transferred to a cell folding process, from a tray to a subsequent process device.

This section provides a general summary of the disclosure and is not a comprehensive disclosure of its full scope or all of its features.

In order to solve the above problems, an aspect among the various aspects of the present disclosure provides a secondary battery cell supply apparatus for a process of folding a secondary battery cell, the secondary battery cell supply apparatus including: a first device configured to grip a secondary battery cell for a cell folding process received in a tray and raise the secondary battery cell for a cell folding process vertically upward; a second device configured to grip the secondary battery cell for a cell folding process gripped by the first device and transfer the secondary battery cell for a cell folding process in a transverse direction when the first device releases the secondary battery cell for a cell folding process; and a third device configured to grip the secondary battery cell for a cell folding process gripped by the second device, rotate the secondary battery cell for a cell folding process, and move the secondary battery cell for a cell folding process upward and downward so that a pair of wide surfaces of the secondary battery cell for a cell folding process is directed in a vertical direction when the second device releases the secondary battery cell for a cell folding process.

In the secondary battery cell supply apparatus for a process of folding a secondary battery cell according to one aspect of the present disclosure, the first device may have a first gripper unit configured to grip the secondary battery cell for a cell folding process, and a first moving unit configured to move the first gripper unit vertically upward and downward; the second device may have a second gripper unit configured to grip the secondary battery cell for a cell folding process, and a second moving unit configured to move the second gripper unit in the transverse direction; and the third device may have a third gripper unit configured to grip the secondary battery cell for a cell folding process, a third moving unit configured to move the third gripper unit downward, and a third rotating unit configured to rotate the third gripper unit.

In the secondary battery cell supply apparatus for a process of folding a secondary battery cell according to one aspect of the present disclosure, a pair of first gripper units, a pair of second gripper units, and a pair of third gripper units may be provided.

In the secondary battery cell supply apparatus for a process of folding a secondary battery cell according to one aspect of the present disclosure, the third device may be disposed on a route through which the second gripper unit is moved by the second moving unit.

In the secondary battery cell supply apparatus for a process of folding a secondary battery cell according to one aspect of the present disclosure, the third gripper unit may be disposed to be opposite to the second gripper unit.

In the secondary battery cell supply apparatus for a process of folding a secondary battery cell according to one aspect of the present disclosure, the third gripper unit may include: a pair of gripping portions configured to press the pair of wide surfaces of the secondary battery cell; and a vacuum suction unit provided on any one of the pair of gripping portions.

In the secondary battery cell supply apparatus for a process of folding a secondary battery cell according to one aspect of the present disclosure, the vacuum suction unit may be disposed at an upper side of the secondary battery cell for a cell folding process when the secondary battery cell for a cell folding process is rotated by the third gripper unit and the pair of wide surfaces is disposed in the vertical direction.

The secondary battery cell supply apparatus for a process of folding a secondary battery cell according to one aspect of the present disclosure, may include: a first loading unit on which the secondary battery cell for a cell folding process is placed by the third gripper unit; and a first loading/moving unit configured to move the first loading unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Exemplary embodiments of the present invention will now be described in detail with reference to the accompanying drawings.

Hereinafter, exemplary embodiments of a secondary battery cell supply apparatus for a process of folding a secondary battery cell according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conforms to the technical spirit of the present disclosure without being limited to a dictionary meaning when recognizing the intrinsic technical spirit of the present disclosure.

A secondary battery loader apparatus for a process of folding a secondary battery cell according to the present disclosure is an apparatus configured to transfer, to a subsequent process, a secondary battery cell for a process of folding a secondary battery cell, which has a sealed portion formed around the secondary battery cell and is received in a tray, which is opened at an upper side thereof, in a state in which the secondary battery cell is erected in the tray.

Figure 1:
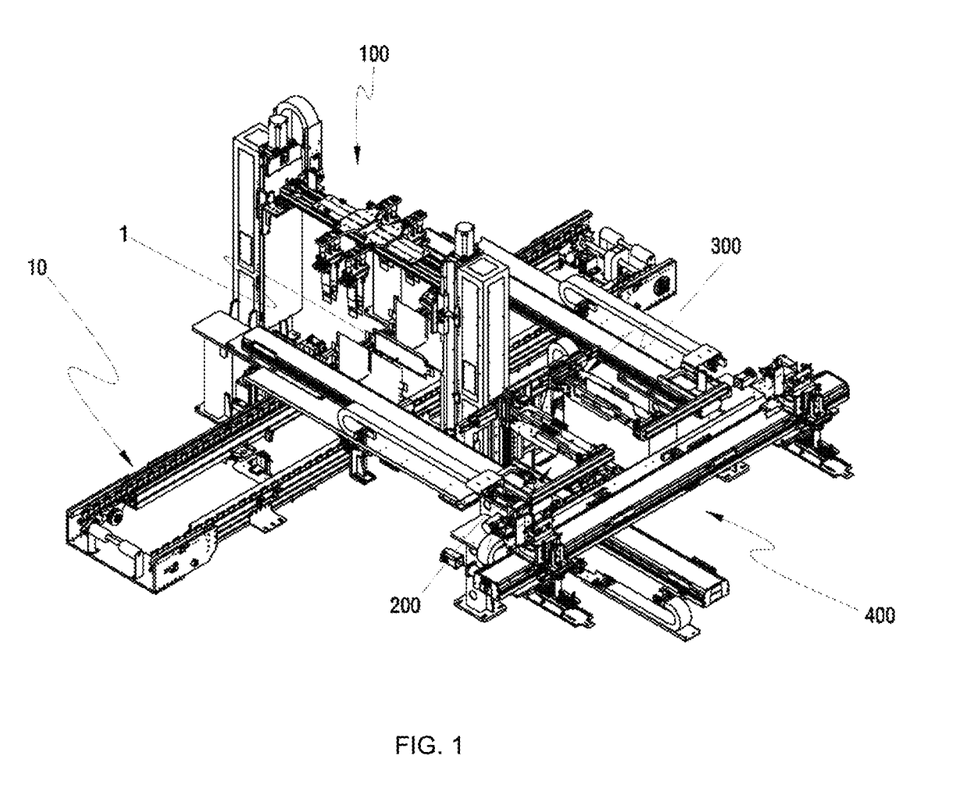
FIGS. 1, 2, 3, 4, 5 and 6 are views for explaining an exemplary embodiment and an operation of a secondary battery cell supply apparatus for a process of folding a secondary battery cell according to the present disclosure.
Figure 2:
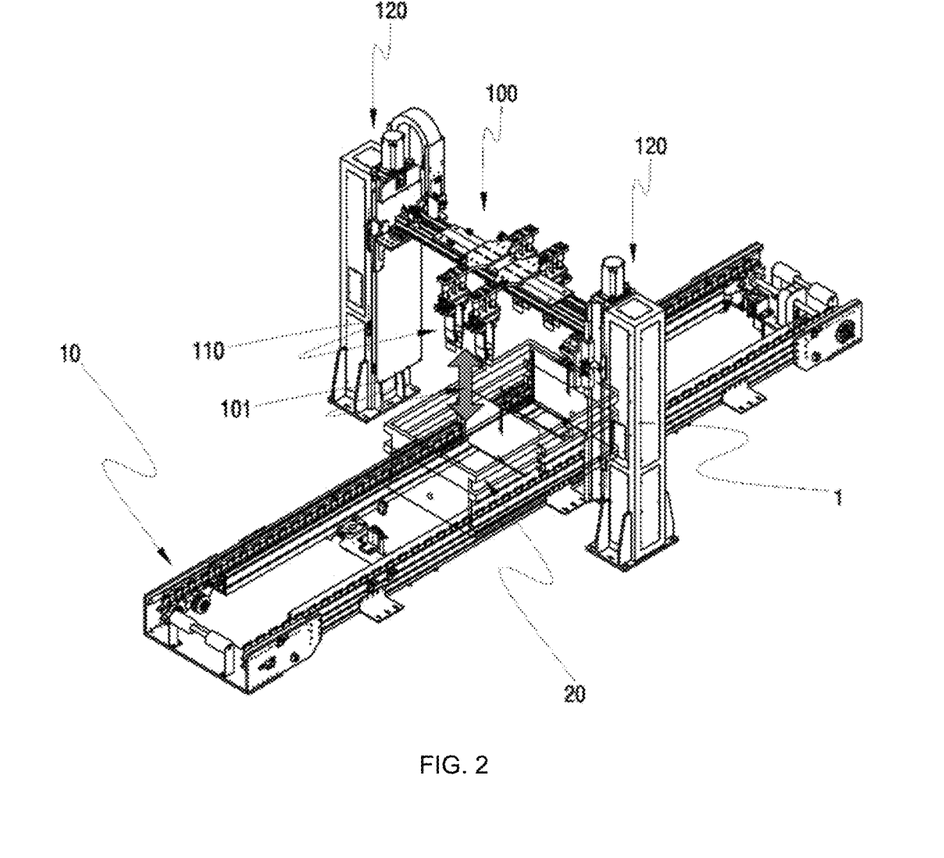
Figure 3:
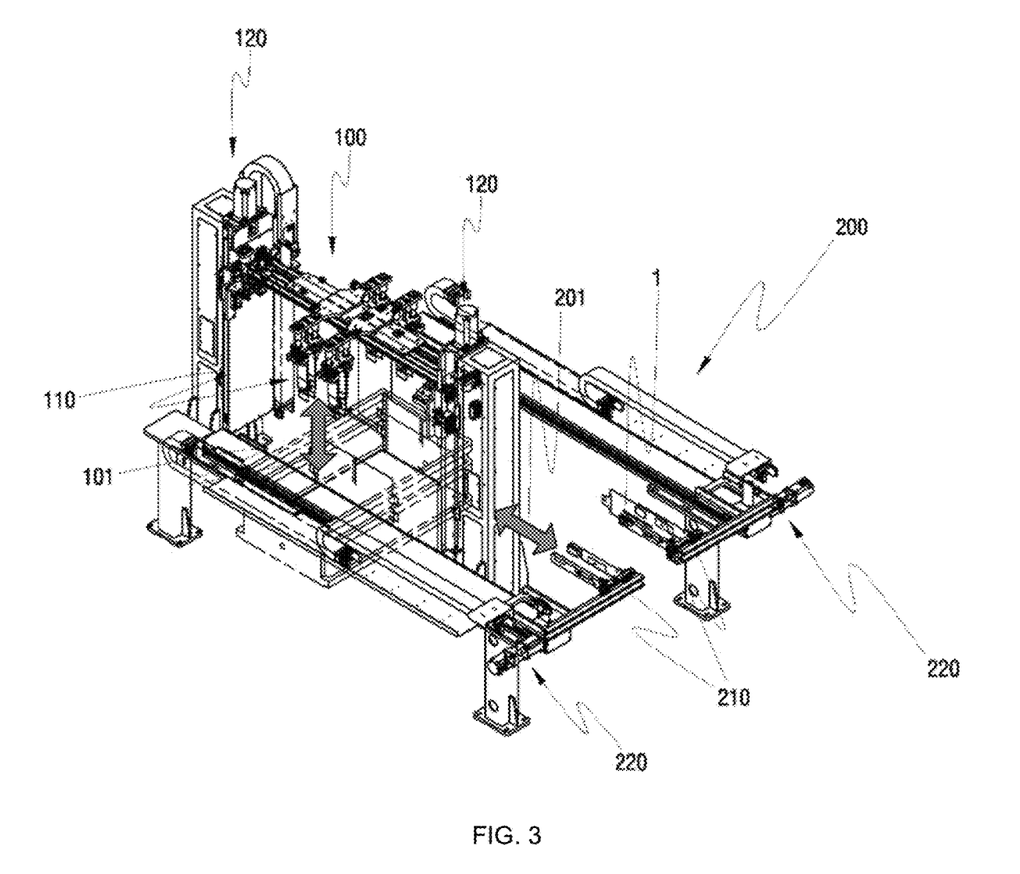
Figure 4:
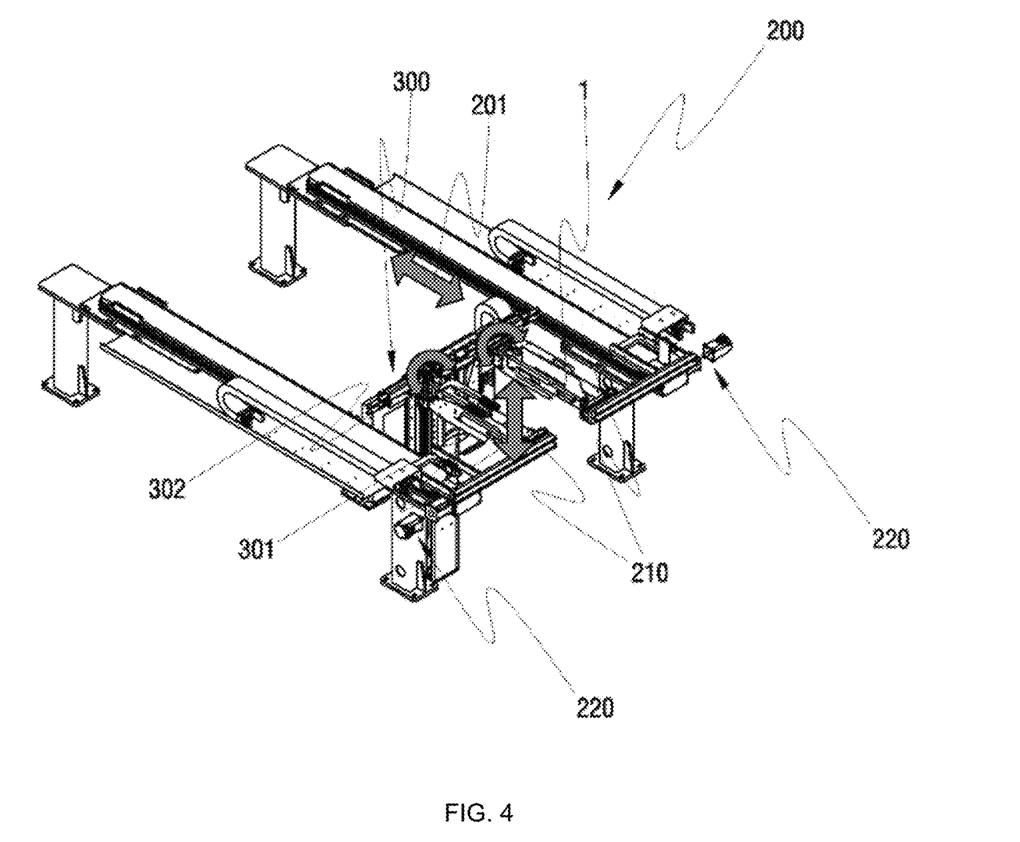
Figure 5:
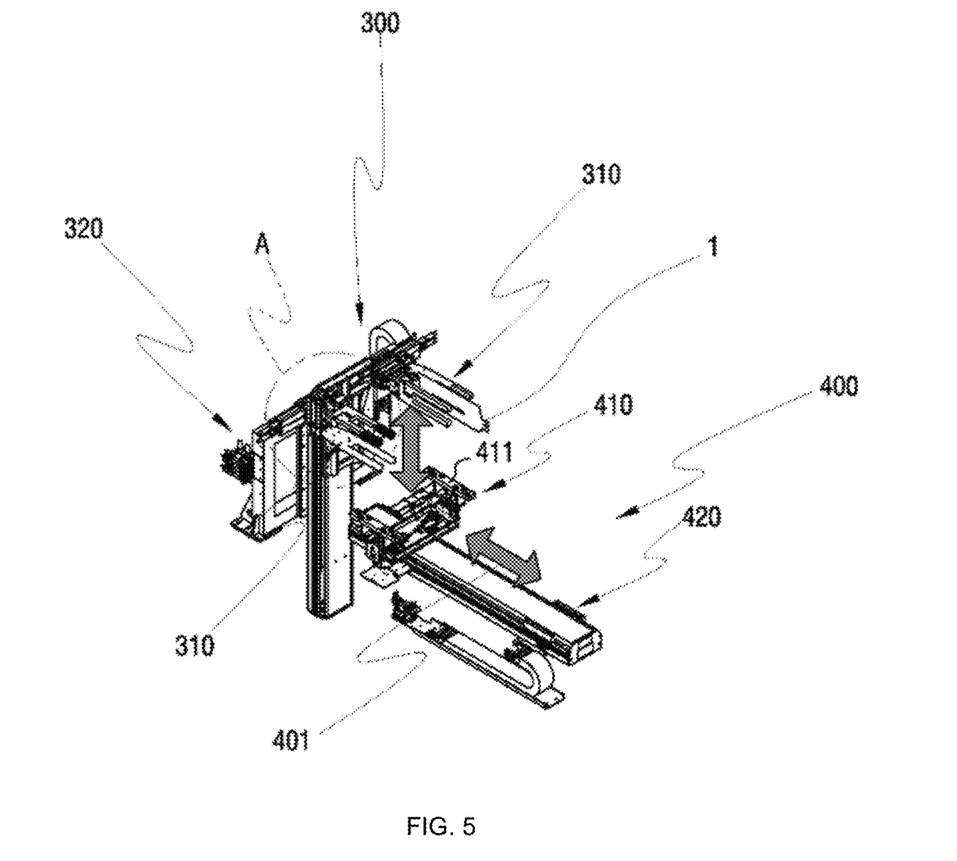
Figure 6:
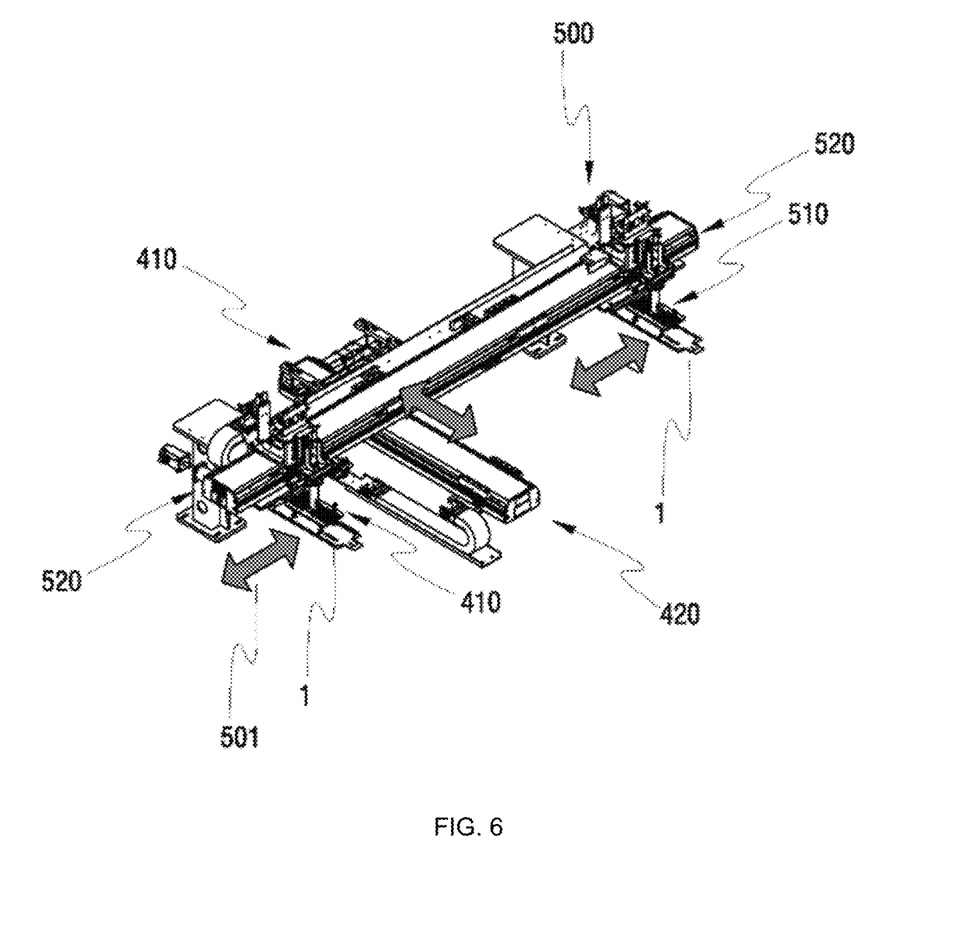
Figure 7:
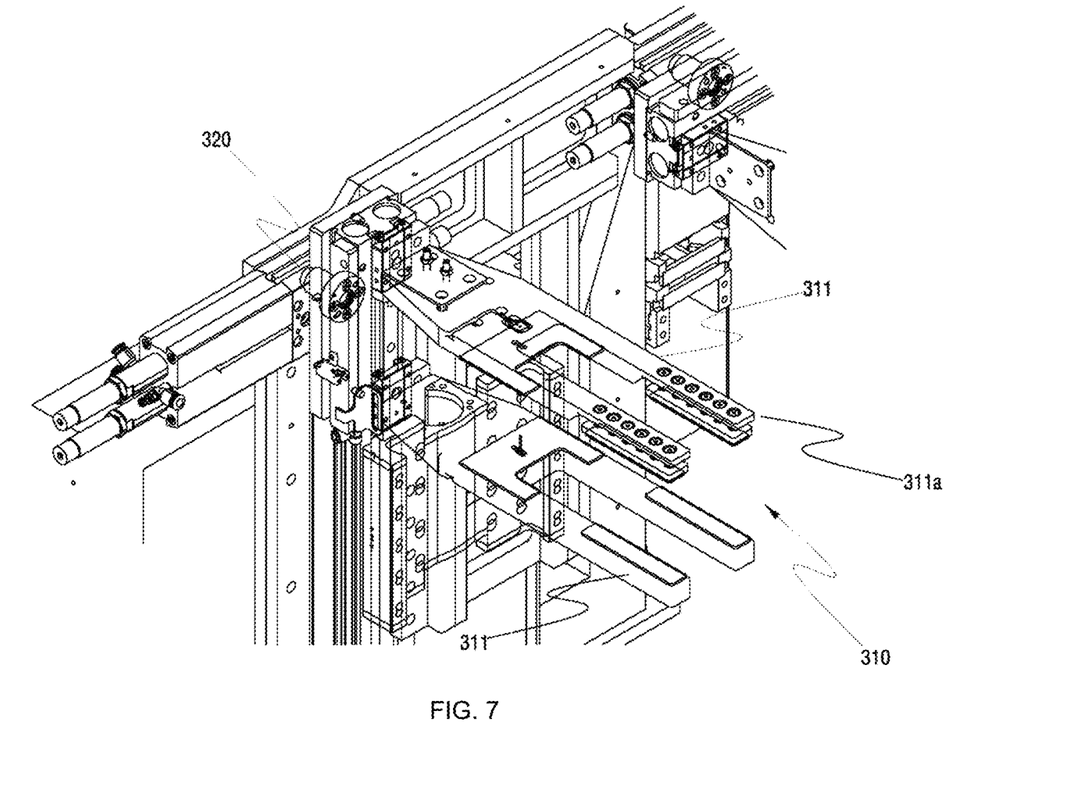
FIG. 7 is an enlarged view of part A in FIG. 5.

FIGS. 1 to 6 are views for explaining an exemplary embodiment and an operation of a secondary battery cell supply apparatus for a process of folding a secondary battery cell according to the present disclosure, and FIG. 7 is an enlarged view of part A in FIG. 5.

Referring to FIGS. 1 to 7, a secondary battery cell supply apparatus for a process of folding a secondary battery cell according to an exemplary embodiment of the present disclosure includes a first device 100, a second device 210, and a third device 300.

The first device 100 grips a secondary battery cell 1 for a cell folding process received in a tray 20 and raises the secondary battery cell 1 vertically upward.

The second device 210 grips the secondary battery cell 1 for a cell folding process gripped by the first device 100. When the first device 100 releases the secondary battery cell 1 for a cell folding process, the second device 210 transfers the secondary battery cell 1 for a cell folding process in a transverse direction.

The third device 300 grips the secondary battery cell 1 for a cell folding process gripped by the second device 210. When the second device 210 releases the secondary battery cell 1 for a cell folding process, the third device 300 moves, downward, the secondary battery cell 1 for a cell folding process while rotating the secondary battery cell 1 for a cell folding process so that a pair of wide surfaces of the secondary battery cell 1 for a cell folding process is directed in a vertical direction.

Therefore, the secondary battery cell supply apparatus for a process of folding a secondary battery cell according to the present disclosure moves the secondary battery cell 1, which is received in the tray 20, to inter-process transfer means 400 and 500 that serve to transfer the secondary battery cell 1 to the cell folding process from the tray 20.

This process may be broadly classified into the following three operations.

First, the process includes a first operation of taking the secondary battery cell 1 out of the tray 20.

Second, the process includes a second operation of moving the taken secondary battery cell 1 to a position adjacent to a moving device.

Third, the process includes a third operation of changing a posture of the secondary battery cell 1 moved by the second operation and loading the secondary battery cell 1 on a transfer means.

The first to third operations will be described in detail below.

The first operation is an operation of taking the secondary battery cells 1, which are arranged in the transverse direction and erected in the tray 20, out of the inside of the tray 20.

In general, if the secondary battery cells 1 each having a plate shape are stacked to overlap one another so that the wide surfaces thereof are directed in the vertical direction, it is difficult to handle the respective secondary battery cells 1 one by one.

The completely manufactured secondary battery products may be stacked to overlap one another in order to stack a maximum number of secondary battery products within a single area.

However, the secondary battery cells, which are to be moved between the manufacturing processes, need to be stacked to be spaced apart from one another in order to make it easy to handle the respective secondary battery cells. Therefore, the secondary battery cells may be erected vertically and received in the tray.

When the secondary battery cell is erected and received, it is possible to raise the secondary battery cell vertically upward from the inside of the tray, thereby saving a horizontal space.

Referring to FIGS. 1 to 7, the first operation is performed by the first device 100 of the secondary battery cell supply apparatus for a process of folding a secondary battery cell according to the present exemplary embodiment.

The secondary battery cell 1, which is taken out of the inside of the tray 20 by the first operation, is moved to the inter-process transfer means 400 and 500 by the second operation.

The first operation may be continuously performed by organic operations of a tray transfer means and the first device 100.

The tray transfer means and the first device 100, which are configured to perform the first operation, are separate operations or systems distinguishable from a cell folding process system, such that the tray transfer means and the first device 100 are installed to be spaced apart from the cell folding process system.

The second operation moves the secondary battery cell, which is taken by the first operation, to the position adjacent to the cell folding process system.

Referring to FIGS. 1 to 7, the second operation is performed by the second device of the secondary battery cell supply apparatus for a process of folding a secondary battery cell according to the present exemplary embodiment.

The third operation loads the secondary battery cell 1, which is moved by the second operation, on the inter-process transfer means 400 and 500.

In this case, the third operation includes two types of operations that need to be performed together or sequentially.

First, the posture of the secondary battery cell 1 needs to be changed.

As described above, the secondary battery cell 1 received in the tray 20 is erected so that the two wide surfaces thereof are directed toward the left and right.

The first and second operations maintain the posture of the erected secondary battery cell 1 as it is.

The secondary battery cell 1, which is to be transferred to the cell folding process, needs to be disposed so that the two wide surfaces thereof are directed in the vertical direction.

The cell folding process is a process of folding a sealed portion formed at a lateral side of the secondary battery cell 1.

Therefore, the posture of the secondary battery cell 1 received in the tray 20 needs to be changed. The secondary battery cell 1 with the changed posture is loaded on the first inter-process transfer means 400.

Referring to FIGS. 1 to 7, the third operation is performed by the third device 300 of the secondary battery cell supply apparatus for a process of folding a secondary battery cell according to the present exemplary embodiment.

As a result, in the secondary battery cell supply apparatus for a process of folding a secondary battery cell according to the present disclosure, the first operation, the second operation, and the third operation are distributed and performed by the first device 100, the second device 200, and the third device 300, respectively.

Therefore, the first device 100, the second device 200, and the third device 300 are simplified in structure and easily maintained.

In addition, it is possible to reduce the tact time taken to move the secondary battery cell 1, which is received in the tray 20, to the first inter-process transfer means 400.

That is, in the secondary battery cell supply apparatus for a process of folding a secondary battery cell according to the present disclosure, at least two or more operations of the first operation, the second operation, and the third operation are performed at the same time at a particular point in time.

For example, the first operation of taking the secondary battery cell 1 out of the inside of the tray 20 is performed by the first device. The first device 100 repeatedly moves vertically upward and downward, thereby raising the secondary battery cell.

The time required to take out all the multiple secondary battery cells 1 received in the single tray 20 is the product of the number of multiple secondary battery cells and the number of cycles in which the first device 100 repeats the operation.

Because the number of cycles in which the first device repeats the operation is limited to the repeated vertical movement in the vertical direction, the time required to take out all the secondary battery cells 1 received in the single tray 20 is also reduced to that extent.

In this case, the total time required to move the particular secondary battery cell 1 from the tray 20 to the inter-process transfer means 400 and 500 is not reduced.

However, because the multiple secondary battery cells 1 are distributed and moved by the respective operations performed by the first device 100 to the third devices 300, the time interval between the continuous supplies of the secondary battery cells 1 may be significantly reduced.

As a result, the secondary battery cell supply apparatus for a process of folding a secondary battery cell according to the present disclosure may have the same effect as a configuration in which the process of moving the secondary battery cell from the tray 20 to the first inter-process transfer means 400 is implemented by a conveyor system.

Further, referring to FIGS. 1 to 7, in the secondary battery cell supply apparatus for a process of folding a secondary battery cell according to the present exemplary embodiment, the first device 100 has a first gripper unit 110 and a first moving unit 120, and the second device 210 has a second gripper unit 210 and a second moving unit 220.

In addition, the third device 300 has a third gripper unit 310, a third moving unit 320, and a third rotating unit 330.

The first gripper unit 110 grips the secondary battery cell 1 for a cell folding process, and the first moving unit 120 moves the first gripper unit 110 vertically upward and downward (101).

In the secondary battery cell supply apparatus for a process of folding a secondary battery cell according to the present exemplary embodiment, the first gripper unit 110 and the first moving unit 120 perform the first operation.

In this case, the first device 100 may further include a first-first moving unit (not illustrated) that moves the first gripper unit 110 in a width direction of the tray 20.

In order to increase the number of secondary battery cells 1 to be received in the single tray 20, the number of secondary battery cells 1 needs to be increased in a longitudinal direction in which the tray 20 moves.

However, in this case, a length of the tray may be excessively increased.

In a case in which the multiple secondary battery cells 1 are arranged in the width direction of the tray, it is possible to increase the number of secondary battery cells, which may be received in the single tray, without excessively increasing the length of the tray 20.

The second gripper unit 210 grips the secondary battery cell 1 for a cell folding process, and the second moving unit 220 moves the second gripper unit in a transverse direction 201.

In the secondary battery cell supply apparatus for a process of folding a secondary battery cell according to the present exemplary embodiment, the second gripper unit 210 and the second moving unit 220 perform the first operation.

The third gripper unit 310 grips the secondary battery cell 1 for a cell folding process, the third moving unit 320 moves the third gripper unit 310 upward and downward (301), and the third rotating unit 330 rotates (302) the third gripper unit.

The third rotating unit 330 may be embedded and disposed between the third moving unit 320 and the third gripper unit 310.

The rotation direction 302 of the third rotating unit 330 may be selected from a clockwise CW direction or a counterclockwise CCW direction by a user based on the structure of the secondary battery cell 1 and the method of the cell folding process.

In the secondary battery cell supply apparatus for a process of folding a secondary battery cell according to the present exemplary embodiment, the third gripper unit 310, the third moving unit 320, and the third rotating unit 330 perform the third operation.

In addition, referring to FIGS. 1 to 7, in the secondary battery cell supply apparatus for a process of folding a secondary battery cell according to the present exemplary embodiment, a pair of first gripper units 110, a pair of second gripper units 210, and a pair of third gripper units may be provided.

Therefore, the two secondary battery cells 1 may be gripped and moved at the same time.

In addition, in the secondary battery cell supply apparatus for a process of folding a secondary battery cell according to the present exemplary embodiment, the third device 300 is disposed on a route through which the second gripper unit 210 is moved by the second moving unit 220.

In addition, in the secondary battery cell supply apparatus for a process of folding a secondary battery cell according to the present exemplary embodiment, the third gripper unit 310 is disposed to be opposite to the second gripper unit 210.

As illustrated in FIGS. 3 and 4, the second moving unit 220 moves the second gripper unit 210 in a direction away from the first device 100, and then the third moving unit 320 raises the third gripper unit 310.

The raised third gripper unit 310 is disposed at a position at which the third gripper unit 310 may grip the secondary battery cell 1 gripped by the second gripper unit 210.

Therefore, it is possible to minimize an area in which the second device 200 and the third device 300 are disposed.

In addition, the operation of transferring the secondary battery cell 1 may be performed in the state in which the operations of the second gripper unit 210 and the third gripper unit 320 are minimized.

In addition, in the secondary battery cell supply apparatus for a process of folding a secondary battery cell according to the present exemplary embodiment, the third gripper unit 310 has a pair of gripping portions 311 configured to press the pair of wide surfaces of the secondary battery cell 1 for a cell folding process, and a vacuum suction unit 311a provided on any one of the pair of gripping portions 311.

In addition, in the secondary battery cell supply apparatus for a process of folding a secondary battery cell according to the present exemplary embodiment, the vacuum suction unit 311a is disposed at an upper side of the secondary battery cell 1 for a cell folding process when the secondary battery cell 1 for a cell folding process is rotated by the third gripper unit 310 and the pair of wide surfaces is disposed in the vertical direction.

In addition, referring to FIGS. 1 to 7, the secondary battery cell supply apparatus for a process of folding a secondary battery cell according to the present exemplary embodiment may further include the first inter-process transfer means 400 having a first loading unit 410 and a first loading/moving unit 420. The third gripper unit 310 is configured to place the secondary battery cell for a cell folding process on the first loading unit 410, and the first loading/moving unit 420 is configured to move (401) the first loading unit 410.

The first loading unit 410 may further include a loading suction unit 411 that sucks, by vacuum, the secondary battery cell 1 disposed at an upper side of the loading suction unit 411.

Therefore, a state in which the wide upper surface of the secondary battery cell 1 is sucked by the vacuum suction unit 311a may be maintained while the secondary battery cell 1 is loaded onto the first loading unit 410. In this case, the first loading unit 410 may suck the wide lower surface of the secondary battery cell 1.

In addition, in the secondary battery cell supply apparatus for a process of folding a secondary battery cell according to the present exemplary embodiment, the gripping portion 311 of the third gripper unit 310 may have a multi-fingered gripper structure. In this case, the second gripper unit 210 may have a single-fingered gripper structure.

Because the third gripper unit 310 is configured to rotate the secondary battery cell 1, the adoption of the multi-fingered gripper structure may make it easy to grip the secondary battery cell 1 when rotating the secondary battery cell 1.

Referring to FIGS. 1 to 7, another exemplary embodiment of the secondary battery cell supply apparatus for a process of folding a secondary battery cell according to the present disclosure may further include the second inter-process transfer means 500.

The second inter-process transfer means 500 has a second loading unit 510 and a second loading/moving unit 520.

The second loading unit 510 sucks and raises the secondary battery cell 1 loaded onto the first loading unit 410, and then transfers and places the secondary battery cell 1 on a loading device in a subsequent process.

The second loading/moving unit 520 moves (501a) the second loading unit 510.

In addition, the second loading unit 510 may further include a second loading/rotating unit (not illustrated) that may rotate (501b) the sucked secondary battery cell 1 about a vertical axis.

The second loading/rotating unit (not illustrated) may align the secondary battery cell 1 in the rotation direction when loading the secondary battery cell 1 on the loading device in the subsequent process.

In addition, the second loading/rotating unit (not illustrated) may change the posture of the secondary battery cell 1 based on the structure of the secondary battery cell 1 and the method of the cell folding process.

As set forth above, according to exemplary embodiments of the invention, the operating process of moving the secondary battery cell, which is to be transferred to the cell folding process, from the tray to the subsequent process device is divided into the operations, and the operations are distributed to the first device, the second device, and the third device, such that it is possible to considerably reduce the tact time taken to supply the secondary battery cell.

According to the present disclosure, the complicated movement of the secondary battery cell is divided and performed by the first device, the second device, and the third device, and as a result, the structure of the apparatus is simplified, and the apparatus is easily maintained.

While the present invention has been shown and described in connection with the exemplary embodiments, it will be apparent to those skilled in the art that modifications and variations can be made without departing from the spirit and scope of the invention as defined by the appended claims.

What is claimed is:

1. A secondary battery cell supply apparatus for a process of folding a secondary battery cell, the secondary battery cell supply apparatus comprising:

a first device including a pair of first gripper units and a first moving unit, wherein one of the first gripper units is configured to grip a secondary battery cell for a cell folding process received in a tray, and wherein the first moving unit is configured to move the one of the first gripper units vertically upward and downward;

a second device including a pair of second gripper units and a second moving unit, wherein one of the second gripper units is configured to grip the secondary battery cell gripped by the one of the first gripper units, and wherein the second moving unit is configured to move the one of the second gripper units in a transverse direction when the one of the first gripper units releases the secondary battery cell; and a third device disposed on a route through which the one of the second gripper units is moved by the second moving unit, the third device including a pair of third gripper units, a third moving unit, and a third rotating unit, wherein one of the third gripper units is configured to grip the secondary battery cell gripped by the one of the second gripper units, wherein the third rotating unit is configured to rotate the one of the third gripper units, wherein the third moving unit is configured to move the one of the third gripper units upward and downward so that a pair of wide surfaces of the secondary battery cell is directed in a vertical direction when the one of the second gripper units releases the secondary battery cell, wherein the one of the third gripper units is disposed in a different plane than the one of the second gripper units, and wherein the one of the third gripper units includes a pair of gripping portions configured to press the pair of wide surfaces of the secondary battery cell, and a vacuum suction unit provided on any one of the pair of gripping portions.

2. The secondary battery cell supply apparatus of claim 1, wherein the vacuum suction unit is disposed at an upper side of the secondary battery cell when the one of the third gripper units is rotated and the pair of wide surfaces is disposed in the vertical direction.

3. The secondary battery cell supply apparatus of claim 1, further comprising:
- a first loading unit on which the secondary battery cell is placed by the one of the third gripper units; and
- a first loading/moving unit configured to move the first loading unit.

\* \* \* \* \*